United States Patent [19]

Seifert et al.

[11] Patent Number: 4,618,165
[45] Date of Patent: Oct. 21, 1986

[54] DEFLECTION DEVICE FOR SAFETY BELTS

[75] Inventors: Helmut Seifert; Karl Möndel, both of Schwäbisch Gmünd, Fed. Rep. of Germany

[73] Assignee: REPA Feinstanzwerk GmbH, Aldorf, Fed. Rep. of Germany

[21] Appl. No.: 693,730

[22] Filed: Jan. 23, 1985

Related U.S. Application Data

[62] Division of Ser. No. 38,326, May 11, 1979, Pat. No. 4,508,286.

[30] Foreign Application Priority Data

May 12, 1978 [DE] Fed. Rep. of Germany ....... 7814486

[51] Int. Cl.⁴ .............................................. B60R 22/00
[52] U.S. Cl. ................................... 280/808; 242/107; 297/483
[58] Field of Search ............................. 242/107–107.7, 242/76; 280/808; 297/483; 24/163 R, 163 FC, 182, 193, 196, 197, 200, 115 K

[56] References Cited

FOREIGN PATENT DOCUMENTS

| 1240422 | 5/1967 | Fed. Rep. of Germany ...... 280/808 |
| 2711401 | 9/1978 | Fed. Rep. of Germany ...... 297/483 |
| 1013426 | 7/1952 | France .......................... 24/163 FC |

Primary Examiner—John M. Jillions
Attorney, Agent, or Firm—Yount & Tarolli

[57] ABSTRACT

Deflection device for a safety belt which, at one end region, is rolled up in an automatic wind-up device, and is provided at the other end with a lock. An in-between-portion of the belt is routed over a fixed rounded deflection bar. The part of the device which serves for securing it, and the deflection crossbar which has rounded bends at least in the region of the deflection crossbar is formed by a metal stamping.

3 Claims, 9 Drawing Figures

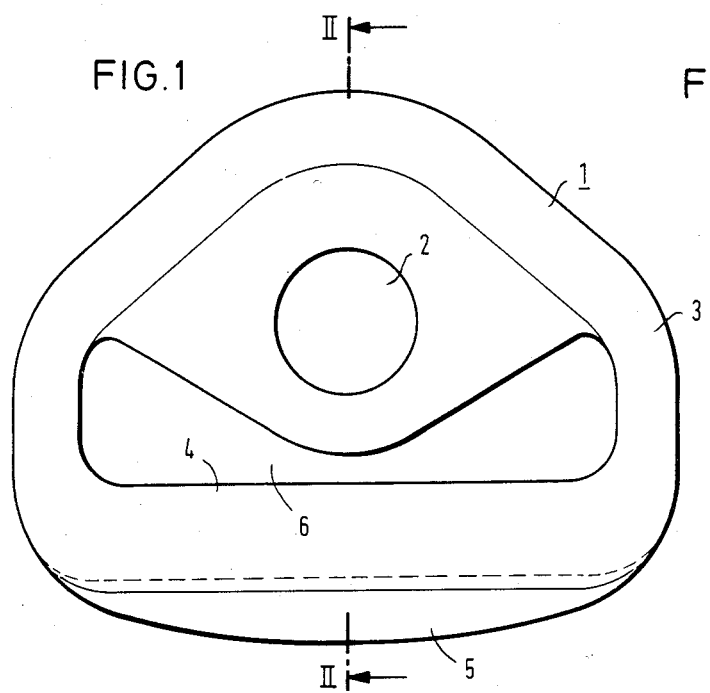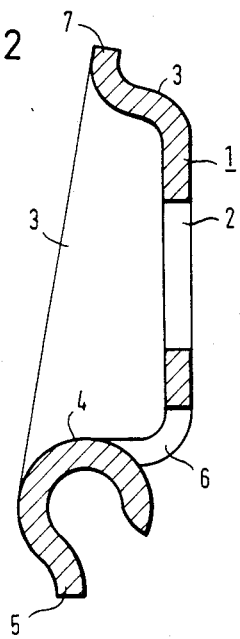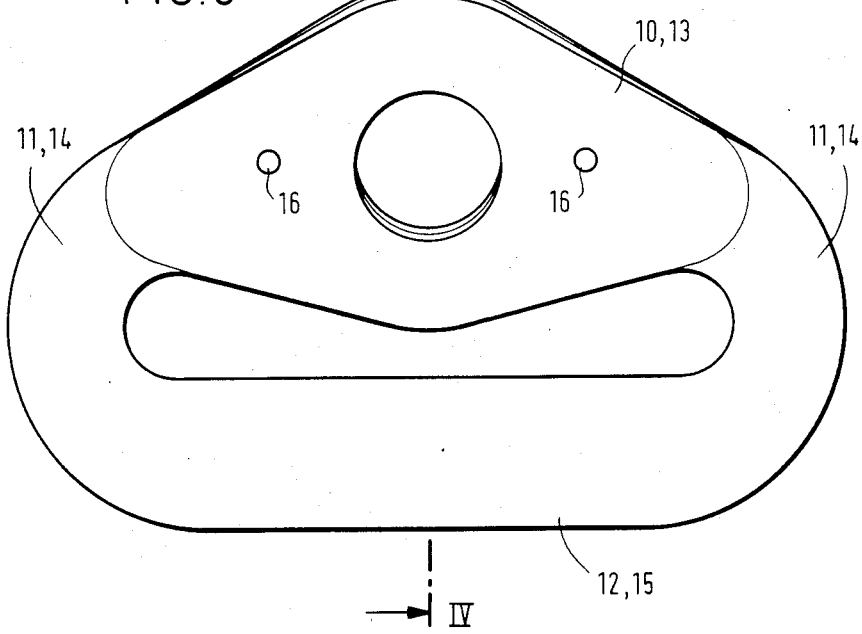

DEFLECTION DEVICE FOR SAFETY BELTS

This is a division, of application Ser. No. 038,326, filed May 11, 1979, now U.S. Pat. No. 4,508,286.

BACKGROUND OF THE INVENTION

1. Field of the Invention

The invention relates to a deflection device for safety belts which is, at one end region thereof, rolled up in an automatic wind-up device and which is provided, at the other end thereof, with a lock. An in between-portion of the belt is routed over a fixed rounded crossbar which deflects the belt.

2. Description of the Prior Art

In the known arrangements of safety belts, the belt is routed over a deflection device which is hingeably secured to the frame of the vehicle. The deflection device is formed as a stamped part similar to a chain link and having a straight cross-bar with rounded edges, over which the safety belt is passed. Experiments have shown, depending on the surface condition of the slide-area under load, that very high friction losses occur when the safety belt is sliding through the device, as well as wear of the belt material by squeezing, due to the small cross-section of the cross-bar. These factors have a negative effect on the ratio of return or retraction force to pull-out force, a ratio which should be kept as small as possible.

SUMMARY OF THE INVENTION

An object of the present invention is to provide a deflection device for a safety belt which will result in materially reduced friction. Another object of the invention is to provide a deflection device which is simple and easy to manufacture and stable and sturdy under conditions of operation.

With the foregoing and other objects in view, there is provided in accordance with the invention a deflection device for a safety belt in a motor vehicle in which one end of the safety belt is rolled up on an automatic winder in an end region and the other end of the belt is adapted for locking engagement, with a belt portion between the automatic winder and the lock routed over a fixed rounded deflection bar, said deflection device formed by a metal stamping with an opening for securing the device to the motor vehicle and a deflection crossbar having a rounded surface in the contact area with the belt.

Other features which are considered as characteristic for the invention are set forth in the appended claims.

Although the invention is illustrated and described herein as embodied in a deflection device for safety belts, it is nevertheless not intended to be limited to the details shown, since various modifications may be made therein without departing from the spirit of the invention and within the scope and range of equivalents of the claims.

BRIEF DESCRIPTION OF THE INVENTION

The invention, however, together with additional objects and advantages thereof will be best understood from the following description when read in connection with the accompanying drawings, in which:

FIG. 1 is a first embodiment of the deflecting device, according to the invention, shown in a front view;

FIG. 2 is a sectional view taken along line II—II, of FIG. 1;

FIG. 3 is a front view of a second embodiment of the deflecting device;

DETAILED DESCRIPTION OF THE INVENTION

Figure 4:
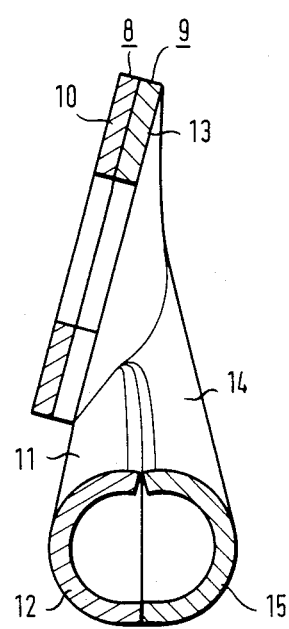
FIG. 4 is a sectional view taken along line IV—IV of FIG. 3.

In accordance with the invention, the part which serves to anchor the deflection device, together with the deflecting crossbar, is formed as a metal stamping which, at least in the region of the crossbar, is provided with rounded bends. The bend is formed preferably, in the region of the crossbar, as a closed or open circular arc. A deflection device of this type can be manufactured by simple stamping and forming methods, whereby the bends have the effect that the bending radii at the flexure points of the belt, can be of practically any size and that, on the other hand, the stability or strength of the device is greatly increased by such bends. Experiments have shown that particularly good results with respect to belt friction are achieved when the circular arc has a radius of more than 6 mm, preferably a radius of at least 7 mm.

The deflecting crossbar, in a preferred form, is open outside from the region where the belt is adjacent to it, i.e. contacting it, and has a radial extension along the greater part of the crossbar, giving the maximum of mechanical load-carrying capability to the deflecting crossbar.

In another embodiment, the closed deflecting crossbar is formed with two semi-circular bent halves by connecting two metal stampings with each other, whereby these two half-crossbars form a tubular cross-section.

To increase the mechanical stability of the deflection device, the portions of the device outside of the crossbar, preferably also have rounded profiles. Thus, it has been proven to be advantageous if the device has a flat surface for securing it, which is surrounded by a closed frame which is bent similarly to the rim of a pot, or is arched throughout and provided with a crossbar, and-/or if the preferably triangular frame is provided with an extension, it is disposed in the plane of the radial extension of the deflecting crossbar.

Further advantageous embodiments and details of the invention follow from the embodiments shown in the drawings and are described below.

Referring to FIG. 1, the deflecting device is formed by a single metal stamping which has a triangular form with rounded corners. The deflecting device which can, for example, be made of sheet steel, has a flat securing plate 1 which may be fastened to the frame of a motor vehicle by means of the fastening hole 2. The securing plate 1 is surrounded by the fitting frame 3 which is bent, similar to the rim of a pot. The frame 3 is provided with a substantially straight crossbar 4 forming the lower part of the frame 3. As shown, particularly, in FIG. 2, the deflecting crossbar 4, in the region where the safety belt is in contact, has the shape of a circular arc with an outer radius of 7 mm. The crossbar 4 is open outside of the region of contact with the safety belt, i.e. toward the bottom. The crossbar 4 has a radial extension 5 extending over the entire length of the crossbar, whereby stiffness or resistance against bending of the crossbar 4 is improved. Also, as FIG. 2 shows, the frame 3 with the deflecting crossbar 4 is arranged at an acute angle with respect to the plane of securing plate 1, so that passage of the belt through cutout 6, between the deflecting crossbar 4 and the securing plate 1 is assured. As further shown in FIG. 2, the frame 3 is also provided with an extension 7 around the frame, which lies in the plane of the radial extension 5 of the crossbar 4.

Figure 5:
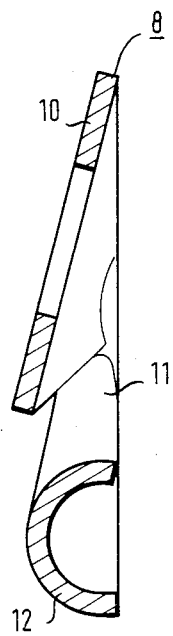
FIGS. 5 and 6 are sectional views of the parts forming the deflecting device according to FIGS. 3 and 4.
Figure 6:
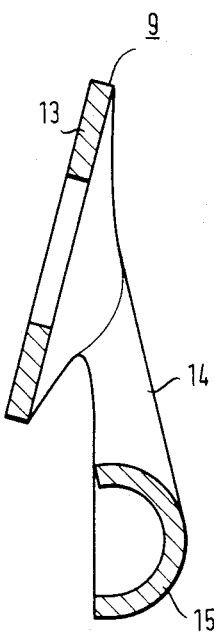

In the embodiment according to FIG. 3, the deflection device consists of two frames 8 and 9, made of metal stampings which are shown in detail in FIGS. 5 and 6. The frames 8 and 9 have a triangular form, similar to the frame in the preceding embodiment. The frame 8 has a flat securing plate 10 with bent frame portions 11 having a semi-circular profile and has also an approximately straight deflection crossbar 12 with a semicircular profile or cross section. The frames 8 and 9, may be put together as shown in FIG. 4 and can be connected, for example, by rivets 16. In this case, the profiled frame parts 11 and 14 and the crossbar portions 12 and 15 augment each other to form a closed tube-shaped cross section, as clearly shown in FIG. 4. The upper edges of the crossbar profile are slightly pulled in, so that the sliding of the belt is not blocked, even at a possible seam. Both securing plates 10 and 13 are provided with openings for fasteners, the holes being aligned.

Figure 7:
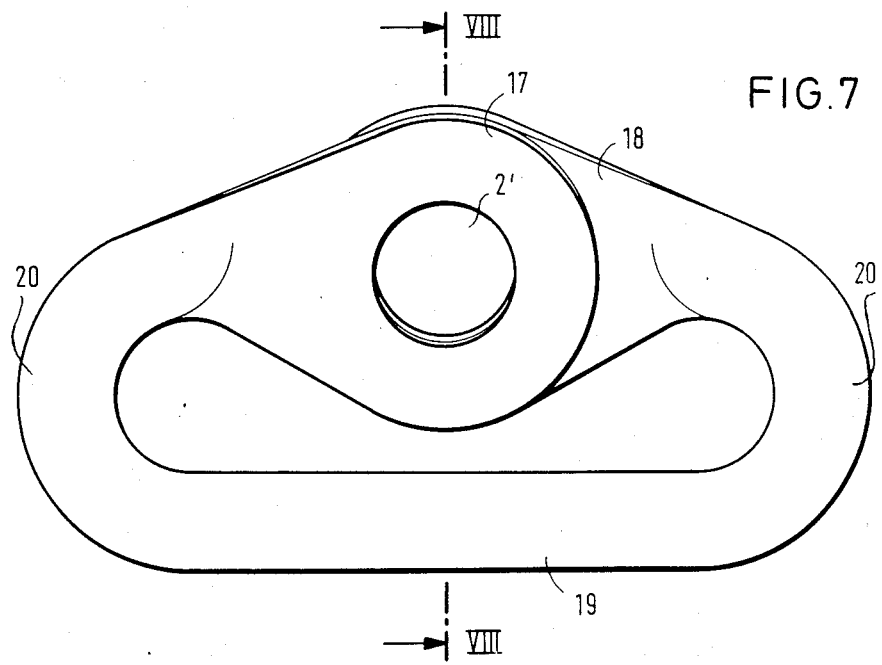
FIG. 7 is a third embodiment of the deflecting device shown in a front view.
Figure 8:
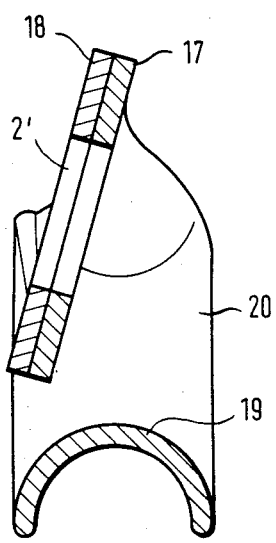
FIG. 8 is a sectional view taken along line VIII—VIII of FIG. 7.
Figure 9:
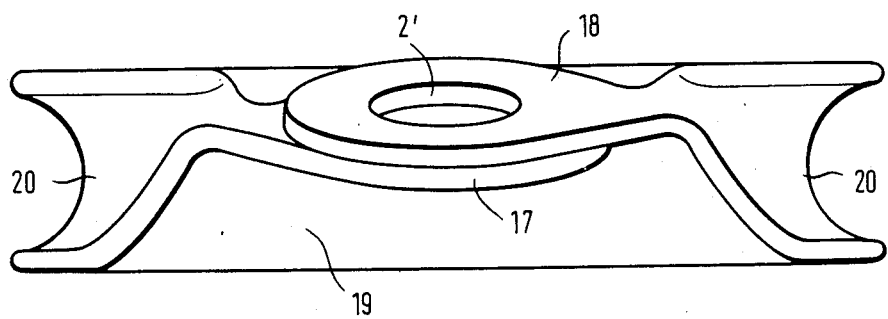
FIG. 9 is a side view of the deflecting device of FIGS. 7 and 8.

The deflection device according to FIGS. 7 to 9 has essentially the basic form according to the preceding embodiments. It consists of a metal stamping in the form of a long strip which is bent to a triangular shape, whereby the ends of the strip 17 and 18 are expanded to form lugs with an opening 2' for the fastener. The lugs are disposed on top of each other or may be connected with each other. The frame portions 20 which enclose the straight semi-circularly bent deflection crossbar 19, as shown in FIG. 9, are semicircularly profiled, corresponding to the profiles of the crossbar 19, whereby the curves of the frame portion 20 and crossbar 19 gradually blend into each other. Also, in this embodiment, as in the preceding examples, the frame with the deflecting crossbar is arranged at an acute angle of approximately 15° with respect to the plane of the securing plate.

There are claimed:

1. A deflection device around which a safety belt for a motor vehicle is turned, said deflection device including a first frame section having a flat mounting portion with an opening therein and a cross bar portion which curves in a first direction from straight upper and lower edge portions and has a generally semicircular cross sectional configuration, a second frame section having a flat mounting portion with an opening therein and a cross bar portion which curves in a second direction from straight upper and lower edge portions and has a generally semicircular cross sectional configuration, said cross bar portions of said first and second frame sections having outer side surfaces with a generally semicircular cross sectional configuration throughout a major portion of their extents, the upper edge portions of said cross bar portions being deflected inwardly toward the centers of curvature of the outer side surfaces so that sliding movement of the safety belt across the upper edge portions of said cross bar portions is not retarded by engagement of the safety belt with the upper edge portions of said cross bar portions, and fastener means for interconnecting said first and second frame sections with the opening in the flat mounting portion of the first frame section aligned with the opening in the flat mounting portion of the second frame section and with the upper and lower edge portions of the cross bar portions disposed in engagement to form a cross bar having a generally circular cross sectional configuration.

2. A deflection device around which a safety belt for a motor vehicle is turned, said deflection device including a first frame section having a first flat mounting portion with parallel major side surfaces, said first flat mounting portion having an opening therein, said first frame section having a first cross bar portion which is connected at its opposite ends to said first mounting portion and cooperates with said first mounting portion to define a first safety belt receiving opening, said first cross bar portion curving in a first direction from straight upper and lower edge portions and having a generally semicircular cross sectional configuration, a second frame section having a second flat mounting portion with parallel major side surfaces, said second flat mounting portion having an opening therein, said second frame section having a second cross bar portion which is connected at is opposite ends to said second mounting portion and cooperates with said second mounting portion to define a second safety belt receiving opening, said second cross bar portion curving in a second direction from straight upper and lower edge portions and having a generally semicircular cross sectional configuration, and fastener means for interconnecting said first and second frame sections with major side surfaces of said first and second mounting portions in flat abutting engagement and with the opening in the mounting portion of said first frame section aligned with the opening in the mounting portion of said second frame section, said fastener means interconnecting said first and second frame sections with the upper and lower edge portions of the cross bar portions disposed in engagement to form a cross bar having a generally circular cross sectional configuration and with the first and second safety belt receiving openings in alignment.

3. A deflection device around which a safety belt for a motor vehicle is turned, said deflection device being stamped from a single flat piece of metal and having first and second flat mounting portions and a cross bar portion disposed beneath said first and second mounting portions, said first mounting portion being formed from one end portion of the single flat piece of metal and having flat side surfaces with an opening formed therein, said second mounting portion being formed from a second end portion of the single flat piece of metal and having flat side surfaces with an opening formed therein, said first and second mounting portions having flat side surfaces disposed in abutting engagement with the openings in said first and second mounting portions disposed in alignment, said cross bar portion being stamped from the single flat piece of metal and having a generally semicircular cross sectional configuration opening downwardly away from said first and second mounting portions, said cross bar portion having a rounded upwardly curving outer side surface for engagement with the safety belt and a rounded upwardly curving inner side surface.

* * * * *